US012212927B2

(12) United States Patent
Kamkar-Parsi et al.

(10) Patent No.: US 12,212,927 B2
(45) Date of Patent: Jan. 28, 2025

(54) METHOD FOR OPERATING A HEARING DEVICE, AND HEARING DEVICE

(71) Applicant: Sivantos Pte. Ltd., Singapore (SG)

(72) Inventors: Homayoun Kamkar-Parsi, Erlangen (DE); Marko Lugger, Erlangen (DE); Juliane Borsum, Erlangen (DE); Manuel Busch, Erlangen (DE); Michael Bürger, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 190 days.

(21) Appl. No.: 17/943,389

(22) Filed: Sep. 13, 2022

(65) Prior Publication Data

US 2023/0080855 A1 Mar. 16, 2023

(30) Foreign Application Priority Data

Sep. 13, 2021 (DE) ..................... 10 2021 210 098.8

(51) Int. Cl.
*H04R 25/00* (2006.01)

(52) U.S. Cl.
CPC ......... *H04R 25/405* (2013.01); *H04R 25/552* (2013.01)

(58) Field of Classification Search
CPC ... H04R 25/405; H04R 25/552; H04R 25/407
See application file for complete search history.

(56) References Cited

U.S. PATENT DOCUMENTS

| | | | |
|---|---|---|---|
| 9,473,860 B2 | 10/2016 | Fischer et al. | |
| 10,142,745 B2 | 11/2018 | Petersen et al. | |
| 10,349,189 B2 | 7/2019 | Kamkar-Parsi et al. | |
| 10,547,956 B2 | 1/2020 | Kamkar-Parsi et al. | |
| 11,070,923 B2 | 7/2021 | Petrausch et al. | |
| 11,102,590 B2 | 8/2021 | Jensen | |

FOREIGN PATENT DOCUMENTS

| | | |
|---|---|---|
| DE | 102019205709 B3 | 7/2020 |
| EP | 2811762 A1 | 12/2014 |
| EP | 3328097 A1 | 5/2018 |
| EP | 3337187 A1 | 6/2018 |
| EP | 3337189 A1 | 6/2018 |
| EP | 3598777 A2 | 1/2020 |

*Primary Examiner* — Tuan D Nguyen
(74) *Attorney, Agent, or Firm* — Laurence A. Greenberg; Werner H. Stemer; Ralph E. Locher

(57) ABSTRACT

A hearing aid has at least two input transducers and at least one output transducer. The input transducers generate an input signal from a sound signal from the surroundings. At least two directional signals with different directional characteristics are formed from the input signals and the directional signals are examined for the presence of a useful signal. A first weighting factor is assigned to the directional signal with the largest signal component of the useful signal and a second weighting factor is assigned to the other directional signals. The directional signals are multiplied by the respectively assigned weighting factor, and an output signal is then formed from the multiplication result. The output signal is converted into a sound signal by the output transducer.

9 Claims, 2 Drawing Sheets

METHOD FOR OPERATING A HEARING DEVICE, AND HEARING DEVICE

CROSS-REFERENCE TO RELATED APPLICATION

This application claims the priority, under 35 U.S.C. § 119, of German Patent Application DE 10 2021 210 098.8, filed Sep. 13, 2021; the prior application is herewith incorporated by reference in its entirety.

FIELD AND BACKGROUND OF THE INVENTION

The invention relates to a method for operating a hearing device which has at least two input transducers and at least one output transducer, wherein on the basis of directional signals generated from the input signals of the input transducers, an output signal is formed which is converted by the output transducer into a sound signal.

Hearing aid devices, or hearing aids, are portable hearing devices that are used to provide care for deaf or hearing-impaired people. In order to meet the numerous individual needs, different types of hearing aids are available, such as behind-the-ear hearing aids (BTE) and hearing aids with an external receiver (RIC: receiver in the canal) as well as in-the-ear hearing aids (ITE), including for example concha hearing aids or channel hearing aids (CIC: Completely-in-Channel, IIC: Invisible-in-the-Channel). The hearing aids listed as examples are worn on the outer ear or in the auditory canal of a hearing aid user. In addition, bone conduction hearing aids, implantable hearing aids, or vibrotactile hearing aids are also available on the market. In these the stimulation of the damaged auditory system takes place either mechanically or electrically.

Such hearing aids generally have an input transducer, an amplifier, and an output transducer as essential components. The input transducer is usually an acousto-electric transducer, such as a microphone, and/or an electromagnetic receiver, such as an induction coil or a (radio frequency, RF) antenna. The output transducer is usually implemented as an electro-acoustic transducer, for example as a miniature speaker (receiver), or as an electromechanical transducer, such as a bone conduction receiver. The amplifier is usually integrated into a signal processing device. The power supply is usually provided by a battery or a rechargeable battery.

In the case of a so-called binaural hearing aid device, two such hearing aids are worn by a user, with a communication link existing between the hearing aids. During operation, data, possibly even large amounts of data, are exchanged, for example wirelessly, between the hearing devices on the right and left ears. The data and information exchanged enable the hearing aids to be adapted particularly effectively to a particular acoustic ambient situation. In particular, this enables a particularly authentic spatial acoustics for the user and improves the intelligibility of speech, even in noisy environments.

The handling of conversational situations is one of the core problems in the application of hearing aids. This is due mainly to the fact that the user of a hearing aid often receives important information in a personal conversation. Purely from the point of view of the most reliable transfer of information possible, it is therefore appropriate to attach particular importance to the intelligibility of speech for the user of a hearing aid. On the other hand, it is precisely speech intelligibility that is often adversely affected by the fact that typical speech situations are superimposed with a high proportion of extraneous noises, such as may be the case, for example, in a conversation with several conversation partners who do not always speak one after the other in turn, or in a dialogue in a closed room, in which other groups of people contribute to a higher noise level due to their own conversations (so-called "cocktail party" listening situation).

To improve the speech intelligibility of the signal of a conversation partner, in modern hearing aids a beamforming or directional microphone algorithm is often applied, by means of which a narrow directional characteristic, e.g., a directional cone, is directed towards the conversation partner. Such a directional cone as a filter over the input signals of the hearing aid causes the speech signal of the conversation partner to be amplified, while sounds originating from a different direction are considerably suppressed.

For a listening situation in which the conversation partner of a user of a hearing aid is moving relative to the user, existing algorithms for improving speech intelligibility that mask background noise by means of a directional characteristic are usually not adequate, as the corresponding directional characteristic would have to be continuously adapted to the changing position of the conversation partner, which would lead to complications particularly when the moving conversation partner is not the only speaker in the vicinity of the user, thus making it much more difficult to identify the conversation partner's position due to the presence of the other speakers.

Hearing aids are disclosed, for example, in our commonly assigned U.S. Pat. Nos. 10,547,956 B2 and 10,349,189 B2, and their counterpart European published patent applications EP 3 337 187 A1 and EP 3 337 189 A1, in which a number of directional signals with different directional characteristics from the microphone signals are used to generate an output signal. In the following, this is also referred to as the multi-beam concept. Such a multi-beam concept enables, for example, a so-called ambient beam or ambient directional cone (region beam). For example, such a region beam is automatically activated when the hearing aid wearer is talking to more than one target speaker, or when the hearing aid wearer is talking to a single speaker in an offset position without having to turn their head to the conversation partner.

The region beam algorithm is designed, for example, in such a way that it covers a specific spatial region in which the conversation partners are located, by controlling and combining multiple flexible, narrow directional signals or directional characteristics from different directions, which are applied in parallel. This region beam creates various new directional characteristics or directional cone patterns that are tailored to the listening situation in which the active conversation partners are present.

However, the technical problem arises that the conversation partners still have the same original speech loudness in the output signal, although the background noise and external interfering noise at a distance can be considerably reduced. This means that there is no enhanced hearing. In other words, the speakers are not louder and do not stand out in the conversation situations in which the hearing aid wearer takes part.

SUMMARY OF THE INVENTION

It is accordingly an object of the invention to provide a particularly suitable method for operating a hearing aid which overcomes a variety of disadvantages of the heretofore-known devices and methods of this general type and which provides for a process in which a speech signal should be emphasized more strongly in the output signal without losing information from the environment. An additional object of the invention is to specify a particularly suitable hearing aid.

With the above and other objects in view there is provided, in accordance with the invention, a method of operating a hearing device having at least two input transducers and at least one output transducer. The method comprises:

acquiring a sound signal from the surroundings by the input transducers and generating an input signal;

forming from the input signals a plurality of directional signals with mutually different directional characteristics;

examining the directional signals for a presence of a useful signal;

assigning a first weighting factor to a directional signal having a largest signal component of the useful signal and assigning a second weighting factor to the other directional signals;

multiplying the directional signals by a respectively assigned weighting factor to form weighted directional signals, forming an output signal from the weighted directional signals, and converting the output signal into a sound signal by the output transducer.

The advantages and embodiments mentioned in relation to the method are also applicable mutatis mutandis to the hearing aid and vice versa. Where method steps are described in the following, advantageous embodiments for the hearing aid are obtained in particular by the fact that the latter is designed to execute one or more of these method steps.

The method according to the invention is provided for operating a hearing device, in particular a hearing aid, and is also suitable for and designed for this purpose.

The hearing aid has at least two input transducers for generating input signals and at least one output transducer for generating a sound signal.

In accordance with the method, at least two directional signals with different directional characteristics are formed from the input signals, wherein the directional signals are then examined for the presence of a useful signal. A first weighting factor is assigned to the directional signal with the largest signal component of the useful signal and a second weighting factor is assigned to the other directional signals. According to the invention, the directional signals are multiplied by the respective assigned weighting factor, and then an output signal is formed from the result, which is converted into a sound signal by the output transducer. The weighting factors used here are preferably linear factors. As a result, a particularly suitable method for operating the hearing aid is implemented. In particular, a multi-beam or region beam concept is thus implemented, in which the useful signal or useful signal components can be automatically represented in the output signal more prominently and loudly by means of the weighting factors. Thus, a multi-beam or region beam extension is implemented, which can be adapted particularly flexibly to the respective listening situation, and in which background noise and distant interfering signal sources can be reduced.

A reference signal in this context is to be understood to mean a signal which has a particularly high sensitivity to a reference sound of a reference sound source in a particular angular range, and when the reference sound source is arranged outside the given angular range, has a significantly reduced sensitivity with respect to the reference sound. In particular, the reference signal can have a maximum in its sensitivity with respect to the reference sound at a given central angle, the sensitivity with respect to the reference signal decreasing with increasing angular distance from the central angle. This angular dependency is also referred to below as the directional characteristic. Directional characteristics include, in particular, directional cones or directional lobes (rays, beams), i.e., directional characteristics with a lobe- or cone-shaped geometry. Such directional signals or directional characteristics can be generated from the input signals using "sum and delay" methods, for example.

For example, the examination for the presence of the useful signal is carried out by examining whether the useful signal resembles a useful signal source specified according to its type. A useful signal source specified according to its type includes in particular a useful signal source which can be specified and/or detected on the basis of the spectral properties of signal components of the generated useful signal, e.g., a specific speaker, whose speech signal in the hearing aid can be distinguished from the speech signals of other potential speakers by its spectral properties and by the distribution of formants. For example, spectral parameters of the useful signal source are specified, wherein a probability is determined whether the directional signals contain signal components that are compatible with the spectral parameters. In this case, for example, if a specified probability threshold is exceeded, the presence of the useful signal is concluded. Alternatively, using a voice activity detection unit (VAD), speakers or speech signals can be detected in the input signal, and potential target speakers or useful signals can be determined.

The method according to the invention essentially implements a listening mode in which "extended or enhanced listening" (augmented listening) or "improved listening" or "listening with improved senses" is possible. In this case, it is possible to automatically emphasize the useful signal or the useful signal source, for example an active conversation partner, by means of the first weighting factor to make it more prominent and louder than usual in the output signal. The useful signal source is thus perceived as closer to the hearing aid wearer. This means that the useful signal source is "zoomed in on" and more strongly pronounced in the output signal. The second weighting factors are preferably selected in such a way that ambient sounds in the background are well preserved. The weighting factors therefore essentially implement an automatic volume control in the direction of the useful signal source, i.e., in the direction of the active speakers. This automatic, directional volume control (ADVC) makes it easier for the hearing aid wearer to listen during conversations.

The directional signal, or its directional characteristic, multiplied by the first weighting factor preferably has a comparatively small angular aperture. In other words, this directional signal has a comparatively narrow beam, i.e., narrow angular aperture, by means of which the useful signal or the useful signal source is tracked.

If no useful signal is detected, i.e., if no speaker is active, for example, the method according to the invention is automatically suppressed or terminated, for example. This means that the amplification is preferably only applied when it is necessary. This means that an intelligent amplification is preferably implemented.

In a suitable embodiment, the output signal is formed from a superposition of the directional signals multiplied by the weighting factors. In particular, a linear superposition is performed. This means that the weighted directional signals are preferably added together or summed.

In an advantageous embodiment, the first weighting factor and/or the second weighting factor is/are set according to the current ambient situation. The conjunction "and/or" here and in the following is to be understood to mean that features linked by means of this conjunction can be implemented both jointly and as alternatives to each other.

An ambient situation in this context is in particular an acoustic ambient situation or a listening situation. The ambient situation in this case is identified and characterized, for example, by means of situation detection and/or at least one level measurement and/or at least one algorithm of the hearing aid or the signal processor. For example, the ambient situation is classified according to specified criteria, and each of these classes is assigned a specific setting of the weighting factors. The weighting factors are preferably controlled automatically by a scene analysis, which is based on a combination of speaker localization and tracking, background noise estimations, an estimation of the speech intensity, the signal-to-noise ratio, . . . etc.

For example, the weighting factors are defined in a frequency- and time-dependent manner. In particular, this means that the weighting factors are dimensioned with different sizes in different frequency bands, for example. In particular in the case that the useful signals are speech signals, it is then also possible to take into account the characteristic spectral properties of the voices of the conversation partners at the same time. In order to keep the background sounds in the output signal as natural as possible, even though the useful signal is amplified with the first weighting factor, the second weighting factor is applied in particular over all frequencies or only to specific frequencies.

The weighting factors are set in predefined (value) ranges. Depending on the preference of the hearing aid wearer, for example, the value ranges can be set either in an adaptation software provided by the hearing care professional (HCP) or via external auxiliary devices, for example with an application software (application, app) on a smartphone. This means that the hearing care professional can decide, for example for each hearing aid wearer, whether the user's preference or need tends more toward the enhanced hearing according to the invention rather than toward a conventional type of hearing.

The first weighting factor is advantageously chosen to be greater than the second weighting factor. This ensures that the useful signal is amplified or appears louder in the output signal.

In a possible refinement, the second weighting factor has a value range between zero (0) and one (1). This means that the second weighting factor is greater than or equal to zero 0) and less than or equal to one 1).

In an advantageous embodiment, the first weighting factor is greater than or equal to zero and less than or equal to an adjustable parameter. For example, the parameter in this case is greater than or equal to one, but in particular the parameter is greater than the upper limit of the second weighting factor. By modifying or optimizing the parameter, a desired gain factor for the useful signal can be easily set.

In a suitable design, the parameter is set according to a signal level of the useful signal. This means that the amount of gain is controlled by the original input volume of the useful signal. If the signal level of the useful signal is below a certain threshold, the first weighting factor is automatically increased. If, for example, a conversation partner is speaking quietly during a conversation, an even greater amplification is automatically applied to the useful signal. If, on the other hand, the speaker is already loud, then the gain or the first weighting factor is reduced, for example automatically.

In a preferred application, the useful signal is a speech signal. This means that the useful signal source is a specific speaker or conversation partner, and the useful signal is a (human) speech signal. Especially in the case of a speaker as the useful signal source, the method can be applied particularly advantageously, since on the one hand a specific speech signal can be identified based on a plurality of spectral parameters characteristic of the voice and of the speech, so that a particularly reliable amplification is made possible by means of the first weighting factor. As a result, the intelligibility of the speech signal is substantially improved.

The hearing aid according to the invention is used, in particular, for treating a hearing-impaired user (hearing system user). The hearing aid is designed to capture sound signals from the environment and to output them to a user of the hearing aid. For this purpose, the hearing aid has at least two input transducers, in particular acoustic-electric transducers such as microphones, and at least one output transducer, in particular an electroacoustic transducer, such as a receiver. The input transducers capture sound signals (noises, tones, speech, etc.) from the environment during operation of the hearing aid and convert each of them into an electrical input signal. An electrical output signal is generated from the electrical input signal by modifying the input signal in a signal processor. The signal processor is part of the hearing aid, for example. The input transducer and the output transducer, as well as the signal processor if present, are housed in particular in a housing of the hearing aid. The housing is designed in such a way that it can be worn by the user on the head and near the ear, e.g., in the ear, on the ear, or behind the ear. The hearing aid is preferably designed as a BTE hearing aid, an ITO hearing aid, or an RIC hearing aid.

The hearing aid, in particular the signal processor, also has a controller, i.e., a control unit. The controller in this case is generally configured—in software and/or circuit technology—for carrying out the method according to the invention described above. The controller is thus specifically configured to determine a number of directional signals from the input signals and to analyze signal components of a useful signal in the directional signals, as well as to assign weighting factors to the directional signals depending on the signal components and to multiply the weighting factors by these signals, and to generate an output signal for the output transducer from these.

In a preferred embodiment, the controller, at least in essence, is formed by a microcontroller with a processor and a data store, in which the functionality for carrying out the method according to the invention is implemented in software in the form of operating software (firmware), so that the method—possibly in interaction with a device user—is carried out automatically when the application software is executed in the microcontroller. As an alternative within the scope of the invention, the controller can also be formed by a non-programmable electronic component, such as an application-specific integrated circuit (ASIC), in which the functionality for carrying out the method according to the invention is implemented in circuit technology.

An additional or further aspect of the invention provides that the hearing aid is binaural and for this purpose has two individual devices, each having at least one input transducer and at least one output transducer, and thus being designed to detect sound signals from the environment and to output them to a user of the hearing aid. For example, a wireless interface is provided for data exchange between the two individual devices. The directional characteristics of the directional signals are in particular binaural directional characteristics, which means that the directional signals are determined on the basis of the input signals of both individual devices.

In a binaural hearing aid, the two individual devices are worn by the user on different sides of the head, so that each individual device is assigned to one ear. As an alternative to a binaural hearing aid however, a monaural hearing aid with only one individual device is also suitable. The statements relating to a monaural hearing aid are transferable mutatis mutandis to a binaural hearing aid and vice versa.

Other features which are considered as characteristic for the invention are set forth in the appended claims.

Although the invention is illustrated and described herein as embodied in a method for operating a hearing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Equivalent parts and dimensions are provided with the same reference signs throughout the figures.

DETAILED DESCRIPTION OF THE INVENTION

Figure 1:
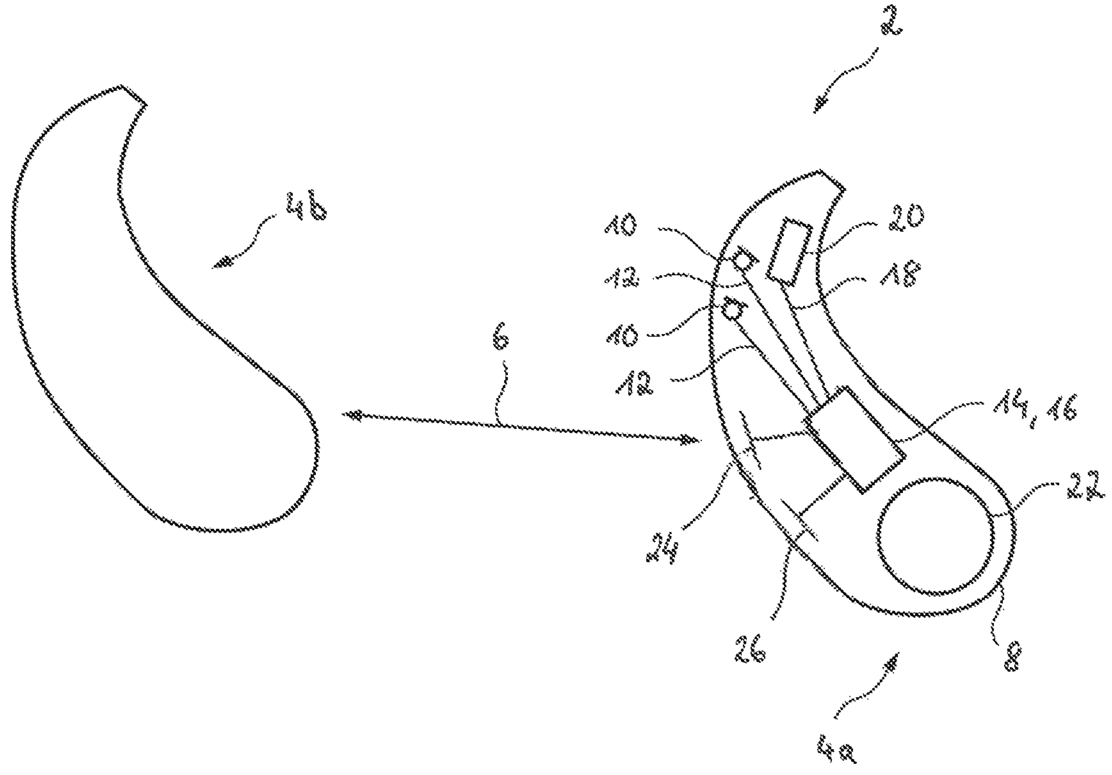
FIG. 1 is a schematic view of a binaural hearing aid.

Referring now to the figures of the drawing in detail and first, in particular, to FIG. 1 thereof, there is shown a basic structure of a hearing aid 2 according to the invention. In the exemplary embodiment, the hearing aid 2 is designed as a binaural hearing aid with two hearing aid devices or individual devices 4*a*, 4*b* which are coupled together for signal transmission. The individual devices 4*a*, 4*b* are designed, for example, as behind-the-ear hearing aids (BTE). The individual devices 4*a*, 4*b* are or can be coupled to each other for signal transmission via a wireless communication link 6.

By way of example, the communication link 6 is an inductive coupling between the individual devices 4*a* and 4*b*, or alternatively the communication link 6 is implemented for example as a radio link, in particular as a Bluetooth or RFID link, between the individual devices 4*a* and 4*b*.

The design of the individual devices 4*a*, 4*b* is explained below using the individual device 4*a* as an example. As shown schematically in FIG. 1, the individual device 4*a* comprises a device housing 8 in which one or more microphones, also referred to as (acousto-electric) input transducers 10, are installed. Via the input transducers 10, a sound or the acoustic signals in an environment of the hearing aid 2 are captured and converted into electrical acoustic data as input signals 12.

The input signals 12 are processed by a controller 14 of a signal processing device 16, which is also arranged in the device housing 10. Using the input signals 12, the signal processing device 16 generates an output signal 18 which is routed to a loudspeaker or receiver 20. The receiver 20 here is designed as an (electro-acoustic) output transducer 20, which converts the electrical output signal 18 into an acoustic signal or sound signal and outputs it. In the case of the BTE individual device 4*a*, the acoustic signal is transmitted to the eardrum of a hearing aid system user via a sound tube or external receiver, not shown in detail, which is connected to an earmold fitted in the ear canal. However, an electro-mechanical output transducer 20 is also conceivable as the receiver, as in a bone conduction receiver, for example.

The power supply of the individual device 4*a* and in particular of the signal processing device 16 is provided by means of a battery 22 accommodated in the device housing 8.

The signal processing device 16 is connected for signal transmission to a first transceiver 24 and to a second transceiver 26 of the individual device 4*a*. The transceiver 24 is used in particular to transmit and receive wireless signals via the communication link 6 and the transceiver 26 is used to transmit and receive wireless signals using a communication link to a hearing-aid-external auxiliary device, for example to a smartphone. For example, it is also conceivable that only one transceiver is provided for both communication links 8.

Figure 2:
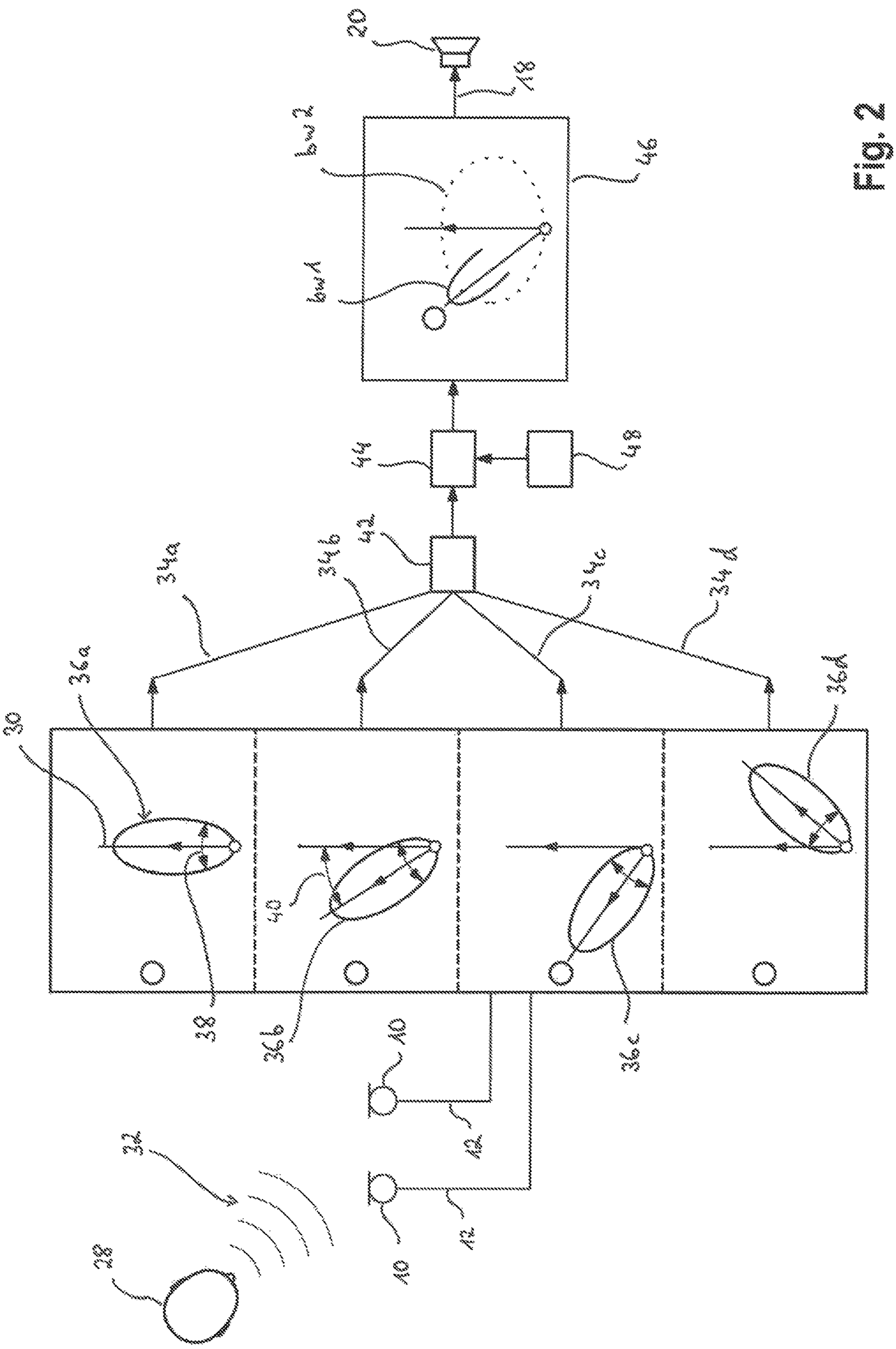
FIG. 2 is a block diagram illustrating a sequence of a method for operating a hearing aid.

In FIG. 2, a block diagram shows a method for operating the hearing aid 2 during a listening situation in which a conversation partner 28 is positioned at an angle of approximately 45° with respect to a frontal direction 30 of the hearing aid user (hearing aid wearer). The listening situation is such that the conversation of the hearing aid user with the conversation partner 28 is superimposed by background noise originating from noise sources distributed in the surroundings.

The conversation partner 28 in this scenario is a useful signal source for the purposes of the signal processing described below or the method described below, wherein the speech or speech signal of the conversation partner 28 represents a useful signal.

The following text describes the method for an individual device 4*a*, 4*b*, which is carried out in the controller 14. However, the method is preferably implemented binaurally, in which case the output signal 18 is generated using the input signals 12 of the input transducers 10 of both individual devices 4*a*, 4*b*.

The sound signal 32, which results from the useful signal and the background noise (interference, noise signals), is detected by the input transducers 10. Each of the input transducers 10 generates a corresponding input signal 12. By means of a spatial filtering, a number of directional signals 34 with different directional characteristics 36 are then formed from the input signals 12.

As an example, FIG. 2 shows four directional signals 34*a*, 34*b*, 34*c*, 34*d* for four different directional characteristics 36*a*, 36*b*, 36*c*, 36*d* in a schematic view. The directional characteristics 36*a*, 36*b*, 36*c*, 36*d* are each formed, for example, as lobe-shaped or cone-shaped directional beams, each with the same angular aperture 38 and differing only with regard to a central angle 40 with respect to the frontal direction 30. The central angle 40 is defined here by the angle between the direction of the maximum sensitivity of the directional characteristic 36*a*, 36*b*, 36*c*, 36*d* and the frontal direction 30 of the hearing aid user.

A selection unit 42 uses the directional signals 34*a*, 34*b*, 34*c*, 34*d* of the directional characteristics 36*a*, 36*b*, 36*c*, 36*d* to determine the presence of the useful signal source or of the conversation partner 28 in the respective direction of the central angle 40 via the corresponding signal levels. In the exemplary embodiment shown, the directional signal 34*c* has the largest signal component of the useful signal.

Then, in an assignment unit 44, a first weighting factor bw1 is assigned to the directional signal 34*c* and a second weighting factor bw2 is assigned to each of the other directional signals 34*a*, 34*b*, 34*d*, and the directional signals 34*a*, 34*b*, 34*c*, 34*d* are multiplied by the respective weighting factor bw1, bw2. The weighting factors bw1 and bw2 can be multiplied by the directional signals 34*a*, 34*b*, 34*c*, 34*d* over all frequencies or applied to specific frequencies (i.e., those relevant for speech comprehension, for example). The weighting factors bw1, bw2 can therefore be dimensioned with different sizes in different frequency bands.

The directional signals 34*a*, 34*b*, 34*c*, 34*d* multiplied by the weighting factors bw1, bw2 are then mixed together in a mixing unit 46 by means of a linear superposition.

Expressed in formulas, the superposition signal for two directional signals (Beam1, Beam2), for example, is obtained for a frequency f at a time t as:

$$\text{Superposition-signal}(f,t)=bw1(f,t)\times\text{Beam1}(f,t)+bw2(f,t)\times\text{Beam2}(f,t)$$

The resulting superposition signal, for example, forms the output signal 18 for the output transducer 20, which converts the output signal 18 into an audible sound signal. However, the superposition signal of the mixing unit 46 is preferably fed to a signal processing block of the signal processor 16, not shown in detail, in which all other processing algorithms specific to the hearing aid 2 are executed. The signal processing block then generates the output signal 18. The signal processing block can also include an amplification in the relevant frequencies in order to make the speaker even clearer in the output signal 18.

The method described above is implemented in particular as a multi-beam or region beam concept, in which the useful signal or useful signal components are automatically represented in the output signal 18 more prominently and louder by means of the weighting factors bw1, bw2. The method essentially implements a listening mode in which "extended or enhanced listening" (augmented listening) is possible. The user of the hearing aid thus perceives the useful signal source or the conversation partner 28 as (spatially) closer. This means that the useful signal source is "zoomed in on" and more strongly pronounced in the output signal 18.

For this purpose, the weighting factor bw1 is dimensioned greater than the weighting factor bw2. In particular, the weighting factor bw2 is greater than or equal to zero and less than or equal to one (0≤bw2≤1). The weighting factors bw2 are preferably selected in such a way that ambient sounds in the background are well preserved. The weighting factor bw1 is greater than or equal to zero and less than or equal to an adjustable parameter (0≤bw1≤parameter). The value ranges of the weighting factors bw1, bw2, and in particular the parameter, can be set depending on the preference of the hearing aid wearer, for example, either in an adjustment software provided by the hearing care professional or via external auxiliary devices, for example with an application software (application, app) on a smartphone.

The weighting factors bw1, bw2 or their values and/or the parameter can be set depending on the current ambient situation or listening situation. The ambient situation is identified and characterized, for example, by means of situation detection 48. The weighting factors bw1, bw2 are preferably controlled automatically by a scene analysis, which is based on a combination of speaker localization and tracking, background noise estimations, an estimation of the speech intensity, the signal-to-noise ratio, . . . etc.

The invention is not limited to the exemplary embodiments described above. Instead, other variants of the invention can also be derived from them by the person skilled in the art, without departing from the subject-matter of the invention. In particular, all individual features described in connection with the exemplary embodiments can also be combined together in different ways without departing from the subject matter of the invention.

The following is a summary list of reference numerals and the corresponding structure used in the above description of the invention:

2 hearing aid
4*a*, 4*b* individual device
6 communication link
8 device housing
10 input transducer
12 input signal
14 controller
16 signal processor
18 output signal
20 output transducer
22 battery
24 transceiver
26 transceiver
28 conversation partner
30 frontal direction
32 sound signal
34*a*, 34*b*, 34*c*, 34*d* directional signal
36*a*, 36*b*, 36*c*, 36*d* directional characteristic
38 angular aperture
40 central angle
42 selection unit
44 assignment unit
46 mixing unit
48 situation detection
bw1, bw2 weighting factors

The invention claimed is:

1. A method of operating a hearing device with at least two input transducers and at least one output transducer, the method comprising:

acquiring a sound signal from the surroundings by the input transducers and generating an input signal;

forming from the input signals at least two directional signals with mutually different directional characteristics;

examining the directional signals for a presence of a useful signal;

assigning a first weighting factor to a directional signal having a largest signal component of the useful signal and assigning a second weighting factor to the other directional signals;

the second weighting factor being greater than or equal to zero and less than or equal to one;

multiplying the directional signals by a respectively assigned weighting factor to form weighted directional signals, forming an output signal from the weighted directional signals, and converting the output signal into a sound signal by the output transducer.

2. The method according to claim 1, which comprises forming the output signal from a superposition of the directional signals multiplied by the weighting factors.

3. The method according to claim 1, which comprises setting at least one of the first weighting factor or the second weighting factor according to an environmental situation.

4. The method according to claim 1, wherein the first weighting factor is greater than the second weighting factor.

5. The method according to claim 1, wherein the useful signal is a speech signal.

6. A hearing aid, comprising:

at least two input transducers for generating input signals;

at least one output transducer for generating a sound signal; and a controller for carrying out a method according to claim 1.

7. The hearing aid according to claim 6 configured as a binaural hearing aid.

8. A method of operating a hearing device with at least two input transducers and at least one output transducer, the method comprising:

acquiring a sound signal from the surroundings by the input transducers and generating an input signal;

forming from the input signals at least two directional signals with mutually different directional characteristics;

examining the directional signals for a presence of a useful signal;

assigning a first weighting factor to a directional signal having a largest signal component of the useful signal and assigning a second weighting factor to the other directional signals;

the first weighting factor being greater than or equal to zero and less than or equal to an adjustable parameter;

multiplying the directional signals by a respectively assigned weighting factor to form weighted directional signals, forming an output signal from the weighted directional signals, and converting the output signal into a sound signal by the output transducer.

9. The method according to claim 8, which comprises setting the adjustable parameter according to a signal level of the useful signal.

* * * * *